United States Patent [19]

Day

[11] Patent Number: 5,611,166

[45] Date of Patent: Mar. 18, 1997

[54] FISHING LURE APPARATUS

[76] Inventor: David R. Day, 8856 W. Shebel Rd., Michigan City, Ind. 46360

[21] Appl. No.: 385,962

[22] Filed: Feb. 9, 1995

[51] Int. Cl.⁶ ..................................................... A01K 83/02
[52] U.S. Cl. .................. 43/35; 43/37; 43/42.41
[58] Field of Search ............................. 43/42.41, 34, 35, 43/36, 37

[56] References Cited

U.S. PATENT DOCUMENTS

| | | |
|---|---|---|
| D. 289,789 | 5/1987 | Ditto . |
| 2,431,181 | 11/1947 | Maietta ........................................ 43/35 |
| 3,665,634 | 5/1972 | Baud ............................................ 43/37 |
| 5,123,196 | 6/1992 | Pagano et al. . |
| 5,146,706 | 9/1992 | Hilliard . |
| 5,195,267 | 3/1993 | Daniels . |
| 5,218,778 | 6/1993 | Szantor . |

FOREIGN PATENT DOCUMENTS

| | | | |
|---|---|---|---|
| 2666961 | 3/1992 | France ................................. 43/42.41 |
| 1139688 | 11/1962 | Germany ............................... 43/34 |

*Primary Examiner*—Kurt Rowan

[57] ABSTRACT

A fishing lure apparatus includes a housing which includes an interior channel located along a longitudinal axis. A rear portion of the housing has an outer width and includes a predetermined number of slots. A shaft assembly, extending through and supported by the interior channel, is adapted for being located in the interior channel in either a locked position or an unlocked position. A hook assembly includes a predetermined number of hooks, and the predetermined number of hooks is equal to the predetermined number of slots. The hook assembly has an outer width which is less than the width of the rear portion of the housing, whereby the hook assembly is protected by the rear portion of the housing when the hook assembly is in a protected mode in which tip portions the hooks are nestled in or retained within the slots. A spring assembly, supported by the housing, is in contact with a spring-contacting portion of the shaft assembly. When the spring-contacting portion is moved along the longitudinal axis toward the front portion of the housing, the shaft assembly can be placed in the locked position. The spring assembly st potential energy. A trigger assembly, connected to the housing, includes a fish-strike-receiving portion and an unlocking portion which releases the shaft assembly from the locked position permitting the shaft assembly to move to the unlocked position, whereby the tip portions of the hooks are exposed to the interior mouth tissues of a fish.

4 Claims, 4 Drawing Sheets

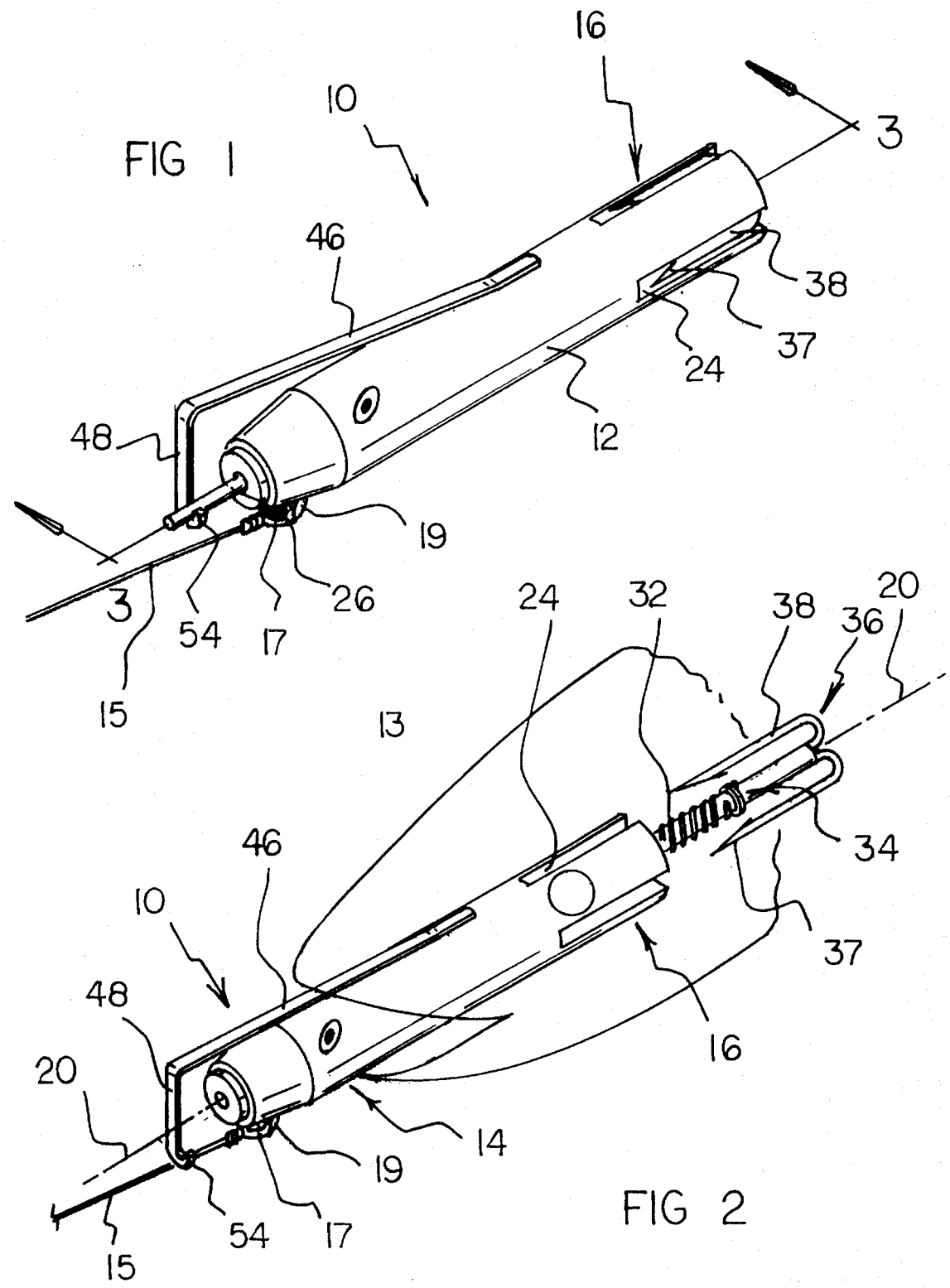

FISHING LURE APPARATUS

BACKGROUND OF THE INVENTION

1. Field of the Invention

The present invention relates generally to fishing lure apparatuses and, more particularly, to fishing lure apparatuses especially adapted for not snagging weeds while in use.

2. Description of the Prior Art

The use of fishing lures is well known in the art of fishing. One problem associated with many lures is that the hooks on the lures snag onto weeds that are present in the water. When this occurs, the effectiveness of the hooks may be reduced, and the lure may lose its characteristics for luring fish.

Throughout the years, a number of innovations have been developed relating to fishing lures that are designed to avoid snagging weeds, and the following U.S. patents are representative of some of those innovations: U.S. Pat. Nos. 5,146,706; and 5,218,778. More specifically, U.S. Pat. No. 5,146,706 discloses a weedless fishing lure apparatus in which a plurality of fish hooks are protected by a corresponding plurality opposing shanks which normally engage the tips of the hooks. When a fish strikes, the shanks are moved away from the tips of the hooks, and the hooks can set in the striking fish. A disadvantage of this fishing lure apparatus is due to the fact that the shanks must be individually set on corresponding hooks. Such an operation is tedious and may be dangerous if the tip of the hooks accidentally penetrate the skin of the fisherman. In this respect, it would be desirable if a fishing lure apparatus avoided the use of individual shanks for protecting individual hook tips.

Another disadvantage associated with the fishing lure apparatus disclosed in U.S. Pat. No. 5,146,706 is the fact that once the tips of the hooks are exposed, there is no source of driving force for driving the hooks into the striking fish. In this respect, it would be desirable if a fishing lure apparatus included elements to provide a driving force for driving a hook into a striking fish.

U.S. Pat. No. 5,218,778 discloses a fishing lure in which a hook rotates around a pivot. Before the fish strikes, the tip of the hook is protected by the body of the lure. After the fish strikes the lure, the tip of the hook is driven into the fish by the force of the fish biting the lure. One disadvantage of this lure is that the force by which the hook is driven into the fish is primarily dependent upon the force by which the fish strikes at the lure. If the fish strikes at the lure with substantial force, then the hook is driven into the fish with substantial force. However, if the fish strikes at the lure with minimal force, then the hook may not even have enough driving force to penetrate into the fish. In this respect, it would be desirable if a fishing lure apparatus provided a substantially large driving force for driving a hook into a fish even if the force of the strike of the fish is minimal.

As second disadvantage of the lure disclosed in U.S. Pat. No. 5,218,778 is the path of motion taken by the tip of the hook as it leaves the lure housing and penetrates into the fish. The path of motion is circular around a central pivot point. Such a circular motion causes the tip of the hook to leave the lure housing in a circular manner and causes the tip of the hook to penetrate the mouth tissues of the fish in a tangential manner. The tangential penetration pattern permits a hook tip to glance off or bounce off the mouth tissues of the fish, whereby the hook may bounce back into the lure housing so that the tip of the hook is once again shielded by the lure housing. In this respect, it would be desirable if a fishing lure apparatus caused a tip of a hook to penetrate into mouth tissues of a fish in a longitudinal manner so that the tip of the hook would not bounce off mouth tissues of the fish and return to the lure housing.

In addition, the following U.S. patents disclose some additional innovations in the art of fishing: U.S. Pat. Nos. 5,123,196; 5,195,267; and U.S. Pat. No. Des. 289,789. More specifically, U.S. Pat. No. 5,123,196 discloses a fishing lure that has an unprotected hook on a flexible tether that is jerked upward toward a housing to set the hook in a fish when the fish strikes at the hook. Clearly, a problem associated with this device is that the unprotected hook can easily snag weeds. Another problem is that the flexible tether can become twisted or entangled with weeds.

U.S. Pat. No. 5,195,267 discloses a tension responsive fishing apparatus that employs a complex fishing rod and complex electronic modules for controlling operation of the complex rod. U.S. Pat. No. Des. 289,789 discloses an artificial fishing hook that employs two hook portion placed in tandem along a common shaft. No means are provided for actively driving a hook into a fish once the fish makes a strike at the hook.

Still other features would be desirable in a fishing lure apparatus. For example, to ensure that a protected hook were deep inside a fish's mouth before the hook were released from its protection to penetrate the fish, it would be desirable if a fishing lure apparatus had a hook assemblage at one end of a lure housing and a trigger for releasing the hook assemblage from the lure housing at another end of the lure housing. Furthermore, for a hook assemblage having a plurality of hooks, it would be desirable if a common shaft were provided for supporting the plurality of hooks, and it would be desirable if a single trigger mechanism were provided for setting and releasing the common shaft.

When a mouth of a fish is open, such as when the fish opens its mouth just prior to biting down on a fishing lure, the lure enters the mouth in a substantially longitudinal direction along a longitudinal axis. However, when the fish closes its mouth to bite down on the lure, the mouth parts move in a direction that is substantially transverse to the longitudinal axis. With these facts in mind, it would be desirable if a fishing lure apparatus permitted a protected hook assemblage to enter a fish's mouth along a longitudinal axis and provided for triggering release of the hook assemblage from protection upon receiving a triggering force that operates transverse to the longitudinal axis.

Thus, while the foregoing body of prior art indicates it to be well known to use protected hooks in fishing lures to prevent snagging of weeds, the prior art described above does not teach or suggest a fishing lure apparatus which has the following combination of desirable features: (1) avoids the use of individual shanks for protecting individual hook tips; (2) includes elements to provide a driving force for driving a hook into a striking fish; (3) provides a substantially large driving force for driving a hook into a fish even if the force of the strike of the fish is minimal; (4) causes a tip of a hook to penetrate into mouth tissues of a fish in a longitudinal manner so that the tip of the hook would not bounce off mouth tissues of the fish and return to the lure housing; (5) has a hook assemblage at one end of a lure housing and a trigger for releasing the hook assemblage from the lure housing at another end of the lure housing; (6) provides a common shaft for supporting a plurality of hooks; (7) provides a single trigger mechanism for setting and releasing a common plural-hook-supporting shaft; and (8)

permits a protected hook assemblage to enter a fish's mouth along a longitudinal axis and provides for triggering release of the hook assemblage from protection upon receiving a triggering force that operates transverse to the longitudinal axis. The foregoing desired characteristics are provided by the unique fishing lure apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a fishing lure apparatus which includes a housing which includes a front portion, a rear portion, and an interior channel extending from the front portion to the rear portion and located along a longitudinal axis. The rear portion has an outer width and includes a predetermined number of slots. A shaft assembly extends through and is supported by the interior channel. The shaft assembly includes a front shaft portion, a rear shaft portion, a spring-contacting portion, and a locking portion. The shaft assembly is adapted for being located in the interior channel in either a locked position or an unlocked position. A hook assembly includes a predetermined number of hooks, and the predetermined number of hooks is equal to the predetermined number of slots. The hook assembly has an outer width. The outer width of the hook assembly is less than the width of the rear portion of the housing, whereby the hook assembly is protected by the rear portion of the housing when the hook assembly is in a protected mode in which tip portions the hooks are nestled in or retained within the slots. A spring assembly, supported by the housing, is in contact with the spring-contacting portion of the shaft assembly. When the spring-contacting portion is moved along the longitudinal axis toward the front portion of the housing, the shaft assembly can be placed in the locked position. The spring assembly st potential energy, and a trigger assembly is connected to the housing.

The trigger assembly includes a fish-strike-receiving portion and an unlocking portion connected to the fish-strike-receiving portion. The unlocking portion is adapted to release the shaft assembly from the locked position to permit the shaft assembly to move to the unlocked position. The spring-contacting portion of the shaft assembly is located at the rear shaft portion, and the spring assembly includes a spiral spring extending around the rear shaft portion. The spring-contacting portion of the shaft assembly is located at the rear shaft portion of the shaft assembly, and the locking portion of the shaft assembly is located at the front shaft portion of the shaft assembly.

The trigger assembly may include a fish-strike-receiving portion in a form of a resilient strip spring which has a rear end connected to the housing and which also has a front end. The trigger assembly also includes an unlocking portion in a form of a strut portion connected to the front end of the fish-strike-receiving portion. The unlocking portion includes a hook end adapted to engage the locking portion of the shaft assembly when the shaft assembly is in the locked position. The locking portion of the shaft assembly is in a form of a locking notch.

Alternatively, the trigger assembly may include a fish-strike-receiving portion in a form of a pivoted arm. A pivot pin is connected to the housing and receives the pivoted arm. A shaft-shifter cam is connected to the pivoted arm. A cam-receiving slot in the housing receives the shaft-shifter cam, and a stop portion is connected to the shaft assembly, for engaging a seat portion of the housing when the shaft assembly is in a locked position.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fishing lure apparatus which has all of the advantages of the prior art and none of the disadvantages.

It is another object of the present invention to provide a new and improved fishing lure apparatus which may be easily and efficiently manufactured and marketed.

It is a further object of the present invention to provide a new and improved fishing lure apparatus which is of durable and reliable construction.

An even further object of the present invention is to provide a new and improved fishing lure apparatus which is susceptible of a low cost of manufacture with regard to both materials and labor, and which accordingly is then susceptible of low prices of sale to the consuming public, thereby making such fishing lure apparatus available to the buying public.

Still yet a further object of the present invention is to provide a new and improved fishing lure apparatus which avoids the use of individual shanks for protecting individual hook tips.

Still another object of the present invention is to provide a new and improved fishing lure apparatus that includes elements to provide a driving force for driving a hook into a striking fish.

Yet another object of the present invention is to provide a new and improved fishing lure apparatus which provides a substantially large driving force for driving a hook into a fish even if the force of the strike of the fish is minimal.

Even another object of the present invention is to provide a new and improved fishing lure apparatus that causes a tip of a hook to penetrate into mouth tissues of a fish in a longitudinal manner so that the tip of the hook would not bounce off mouth tissues of the fish and return to the lure housing.

Still a further object of the present invention is to provide a new and improved fishing lure apparatus which has a hook assemblage at one end of a lure housing and a trigger for releasing the hook assemblage from the lure housing at another end of the lure housing.

Yet another object of the present invention is to provide a new and improved fishing lure apparatus that provides a common shaft for supporting a plurality of hooks.

Still another object of the present invention is to provide a new and improved fishing lure apparatus which provides a single trigger mechanism for setting and releasing a common plural-hook-supporting shaft.

Yet another object of the present invention is to provide a new and improved fishing lure apparatus that permits a protected hook assemblage to enter a fish's mouth along a longitudinal axis and provides for triggering release of the hook assemblage from protection upon receiving a triggering force that operates transverse to the longitudinal axis.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a first embodiment of the fishing lure apparatus of the invention in a hook-protected mode, before a fish strikes.

FIG. 2 is a perspective view of the embodiment of the fishing lure apparatus shown in FIG. 1 in a hook-released mode that is triggered by a fish striking the apparatus.

DESCRIPTION OF THE PREFERRED EMBODIMENT

Figure 3:
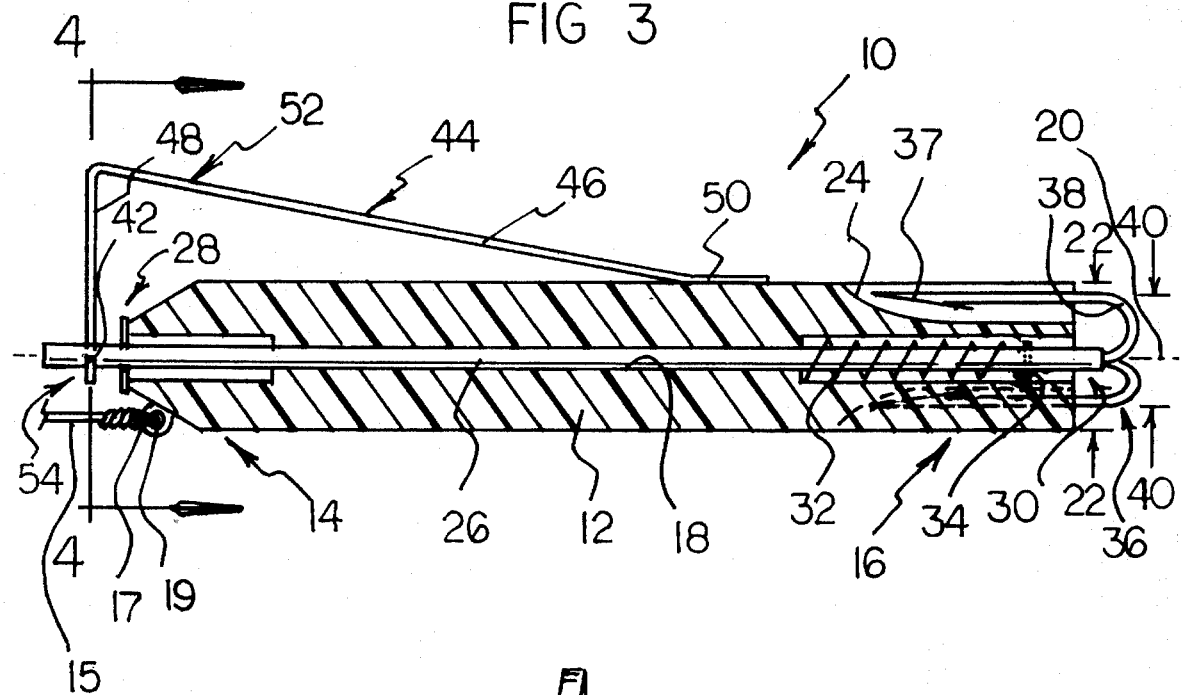
FIG. 3 is an enlarged cross-sectional view of the embodiment of the fishing lure apparatus of FIG. 1 taken along line 3—3 thereof.
Figure 4:
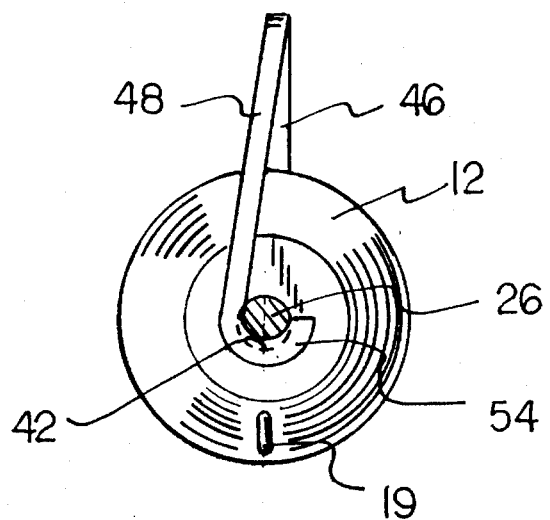
FIG. 4 is an enlarged front view of the embodiment of the invention shown in FIG. 3 taken along line 4—4 of FIG. 3.

With reference to the drawings, a new and improved fishing lure apparatus embodying the principles and concepts of the present invention will be described.

Turning to FIGS. 1–5, there is shown a first embodiment of the fishing lure apparatus of the invention generally designated by reference numeral 10. In its preferred form, fishing lure apparatus 10 includes a housing 12 which includes a front portion 14, a rear portion 16, and an interior channel 18 extending from the front portion 14 to the rear portion 16 and located along a longitudinal axis 20. The rear portion 16 has an outer width 22 and includes a predetermined number of slots 24. A shaft assembly 26 extends through and is supported by the interior channel 18. The shaft assembly 26 includes a front shaft portion 28, a rear shaft portion 30, a spring-contacting portion 34, and a locking portion 42. The shaft assembly 26 is adapted for being located in the interior channel 18 in either a locked position or an unlocked position. A hook assembly 36 includes a predetermined number of hooks 38, and the predetermined number of slots 24 is equal to the predetermined number of hooks 38. The hook assembly 36 has an outer width 40. The outer width 40 of the hook assembly 36 is less than the width 22 of the rear portion 16 of the housing 12, whereby the hook assembly 36 is protected by the rear portion 16 of the housing 12 when the hook assembly 36 is in a protected mode in which tip portions 37 the hooks 38 are retained within the slots 24. A spring assembly 32, supported by the housing 12, is in contact with the spring-contacting portion 34 of the shaft assembly 26, such that, when the spring-contacting portion 34 is moved along the longitudinal axis 20 toward the front portion 14 of the housing 12 such that the shaft assembly 26 is in the locked position. The spring assembly 32 stores potential energy, and a trigger assembly 44 is connected to the housing The trigger assembly 44 includes a fish-strike-receiving portion 46, and an unlocking portion 48 is connected to the fish-strike-receiving portion 46. The unlocking portion 48 is adapted to release the shaft assembly 26 from the locked position to permit the shaft assembly 26 to move to the unlocked position. The spring-contacting portion 34 of the shaft assembly 26 is located at the rear shaft portion 30, and the spring assembly 32 includes a spiral spring 32 extending around the rear shaft portion 30. The spring-contacting portion 34 of the shaft assembly 26 is located at the rear shaft portion 30 of the shaft assembly 26, and the locking portion 42 of the shaft assembly 26 is located at the front shaft portion 28 of the shaft assembly 26.

In the first embodiment of the invention, the trigger assembly 44 includes a fish-strike-receiving portion 46 in a form of a resilient strip spring which has a rear end 50 connected to the housing 12 and which also has a front end 52. The trigger assembly 44 also includes an unlocking portion 48 in a form of a strut portion connected to the front end 52 of the fish-strike-receiving portion 46. The unlocking portion 48 includes a hook end 54 adapted to engage the locking portion 42 of the shaft assembly 26 when the shaft assembly 26 is in the locked position. The locking portion 42 of the shaft assembly 26 is in a form of a locking notch. The fish-strike-receiving portion 46 of the trigger assembly 44 can be connected to the housing 12 with an adhesive or a fastener such as a screw (not shown).

Figure 5:
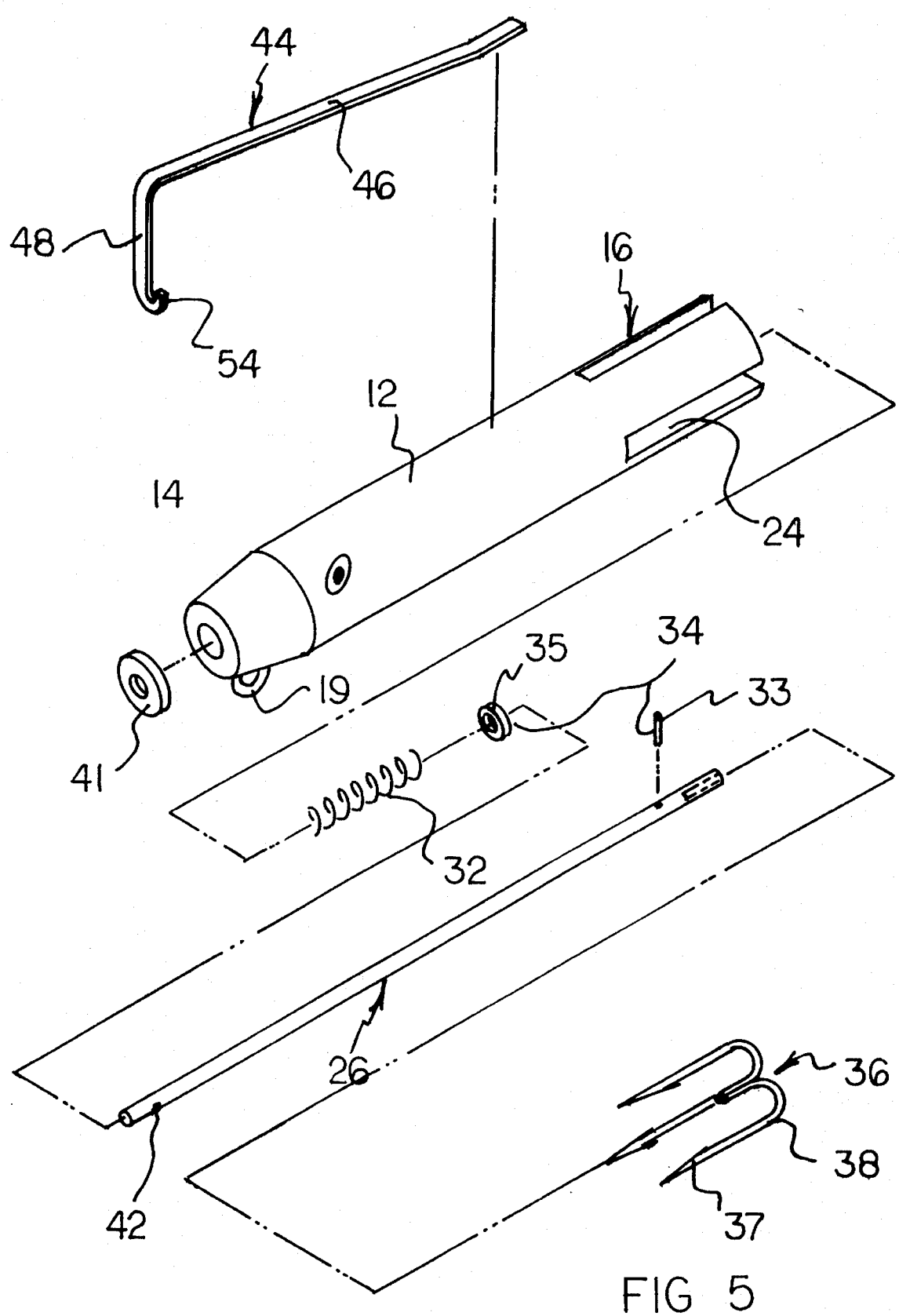
FIG. 5 is an exploded view of the embodiment of the invention shown in FIG. 1.

In operating the first embodiment of the invention (shown in FIGS. 1–5), the fishing lure apparatus 10 is shown in FIG. 1 connected to a fishing line 15 by of a loop 17 in the line 15 and a ting 19 connected to the housing 12. In FIG. 1, the fishing lure apparatus 10 is in a position whereby the hook assembly 36 is protected by the portions of the rear portion 16 of the housing 12 adjacent to the slots 24. As shown in FIG. 3, in this protected position for the hook assembly 36, the spring-contacting portion 34 of the shaft assembly 26 is compressing the spring assembly 32, and the position of the shaft assembly 26 is locked by the engagement of the hook end 54 of the trigger assembly 44 with the locking portion 42 of the shaft assembly 26. Thus, when the shaft assembly 26 is in its locked position, the hook assembly 36 is in its protected position or protected mode. It is noted that the spring-contacting portion 34 of the shaft assembly 26 includes, as shown in FIG. 5, a retainer ring 35 and a lock pin 33. An annular ring 41 is used to cap the front portion 14 of the housing 12.

Next, in operation, a fish 13 approaches the fishing lure apparatus 10 of the invention and engulfs the protected hook assembly 36 in its mouth. Then, as shown in FIG. 2, when the fish 13 strikes or bites down on the fish-strike-receiving portion 46 of the trigger assembly 44, the hook end 54 of the trigger assembly 44 is disengaged from the locking portion 42 of the shaft assembly 26, whereby the compressed spring assembly 32 is free to return to its uncompressed state. When this occurs, the spring assembly 32 pushes up against the spring-contacting portion 34 of the shaft assembly 26 and translates the shaft assembly 26 away from the front portion 14 of the housing 12 toward the rear portion 16 of the housing 12 along the longitudinal axis 20. As a result, the hook assembly 36 is moved out of the protection of the rear portion 16 of the housing 12, and the hooks 38 and their tip portions 37 are exposed to the interior tissues of the fish 13. When the fish 13 pulls back, attempting to either escape from the lure or attempting to vigorously swallow the lure, the tip portions 37 of the hooks 38 are driven into the mouth tissues of the fish 13. It is clear that, before the fish 13 approaches the fishing lure apparatus 10 embodiment of the invention, the hook assembly 36 is protected by the housing 12 and is prevented from snagging weeds.

To reset the fishing lure apparatus 10, the fish 13 is removed from the hooks 38, the hook assembly 36 is pushed toward the rear portion 16 of the housing 12 to compress the spring assembly 32 and to shield the hooks 38 within the slots 24 of the housing 12, and the hook end 54 of the trigger assembly 44 is placed in engagement with the locking portion 42 of the trigger assembly 44. Once the fishing lure apparatus 10 is reset, it is ready for further use.

Figure 6:
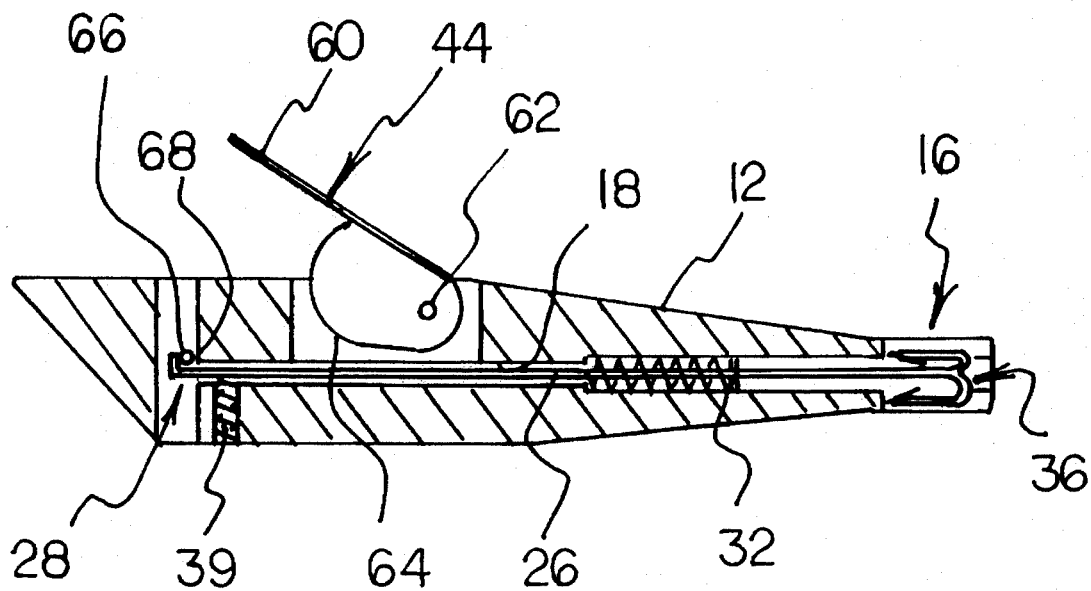
FIG. 6 cross-sectional view of a second embodiment of the invention in a hook-protected mode, before a fish strikes.
Figure 7:
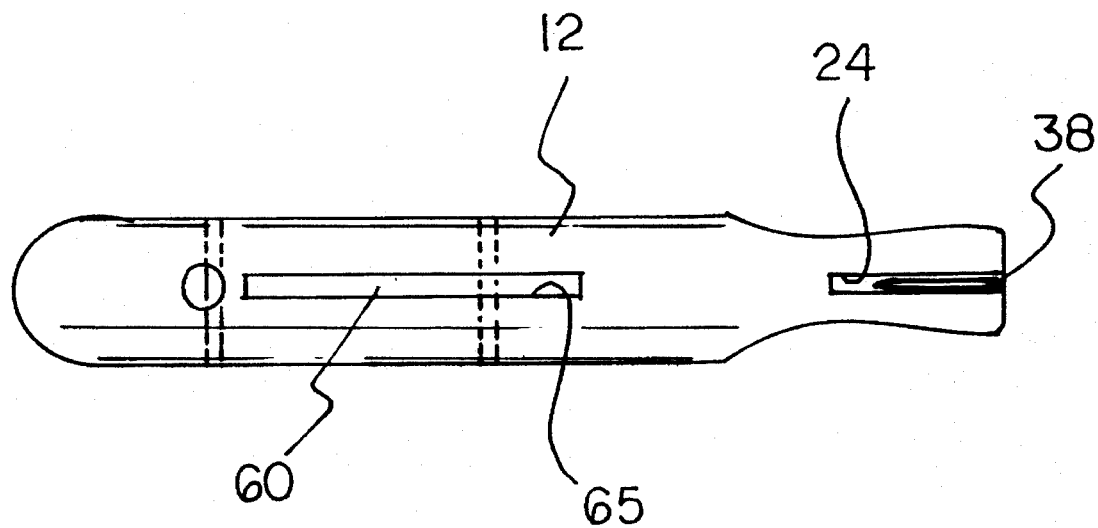
FIG. 7 is a top view of the embodiment of the invention shown in FIG. 6.

Turning to FIGS. 6–7, a second embodiment of the invention is shown. Reference numerals are shown that correspond to like reference numerals that designate like elements shown in the other figures. In addition, the trigger assembly 44 includes a fish-strike-receiving portion in a form of a pivoted arm 60. A pivot pin 62 is connected to the housing 12 and receives the pivoted arm 60. A shaft-shifter cam 64 is connected to the pivoted arm 60. A cam-receiving slot 65 in the housing 12 receives the shaft-shifter cam 64, and a stop portion 66 is connected to the shaft assembly 26, for engaging a seat portion 68 of the housing 12 when the shaft assembly 26 is in a locked position.

In operating the second embodiment of the invention, as shown in FIG. 6, the hook assembly 36 is protected by the rear portion 16 of the housing 12 by being in the slots 24. In this position, the spring assembly 32 is compressed within the housing 12, and the stop portion 66 of the shaft assembly 26 is in contact with the seat portion 68 of the housing 12. Although not shown in FIGS. 6 and 7, it is understood that a fish 13 would engulf the rear portion 16 of the housing 12 with the protected hook assembly 36 in its mouth. Then, the fish 13 would bite down on the pivoted arm 60 of the trigger assembly 44 whereby the shaft-shifter cam 64 pivots around the pivot pin 62 causing the shaft-shifter cam 64 to bump up against the shaft assembly 26 and shift its position within the interior channel 18 of the housing 12. When the shaft assembly 26 is bumped by the shaft-shifter cam 64, the stop portion 66 of the shaft assembly 26 is caused to slide off of the seat portion 68 of the housing 12. As a result, the front shaft portion 28 is pulled by the spring assembly 32 toward the rear portion 16 of the housing 12. At the same time, the hook assembly 36 is caused to translate along the longitudinal axis 20 away from the rear portion 16 of the housing 12. Thereby, the tip portions 37 of the hooks 38 are no longer protected. When the fish 13 makes a quick movement, either to devour the fishing lure apparatus 10 or to escape from it, the tip portions 37 of the hooks 38 are driven into the interior mouth tissues of the fish 13.

A tension spring 39 is provided to control bias of the shaft assembly 26 so that the stop portion 66 of the shaft assembly 26 is normally in engagement with the seat portion 68 of the housing 12. The tension in the tension spring 39 is overcome by the shaft-shifter cam 64 when the fish 13 bites down on the pivoted arm 60 of the trigger assembly 44.

To reset the second embodiment of the invention, the pivoted arm 60 is lifted, and the hook assembly 36 is moved along the longitudinal axis 20 in the direction of the seat portion 68 of the housing 12 so that the spring assembly 32 is compressed, the stop portion 66 of the shaft assembly 26, being pushed up by tension of the tension spring 39, engages the seat portion 68 of the housing 12, and the hooks 38 are nestled in the slots 24 of the rear portion 16 of the housing 12.

The components of the fishing lure apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved fishing lure apparatus that is low in cost, relatively simple in design and operation, and which may advantageously be used to avoid the use of individual shanks for protecting individual hook tips. With the invention, a fishing lure apparatus is provided which includes elements to provide a driving force for driving a hook into a striking fish. With the invention, a fishing lure apparatus provides a substantially large driving force for driving a hook into a fish even if the force of the strike of the fish is minimal. With the invention, a fishing lure apparatus is provided which causes a tip of a hook to penetrate into mouth tissues of a fish in a longitudinal manner so that the tip of the hook would not bounce off mouth tissues of the fish and return to the lure housing. With the invention, a fishing lure apparatus is provided which has a hook assemblage at one end of a lure housing and a trigger for releasing the hook assemblage from the lure housing at another end of the lure housing. With the invention, a fishing lure apparatus provides a common shaft for supporting a plurality of hooks. With the invention, a fishing lure apparatus provides a single trigger mechanism for setting and releasing a common plural-hook-supporting shaft. With the invention, a fishing lure apparatus is provided which permits a protected hook assemblage to enter a fish's mouth along a longitudinal axis and provides for triggering release of the hook assemblage from protection upon receiving a triggering force that operates transverse to the longitudinal axis.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. A fishing lure apparatus, comprising:

a housing which includes a front portion, a rear portion, and an interior channel extending from said front portion to said rear portion and located along a longitudinal axis, wherein said rear portion has an outer width and includes a predetermined number of slots, a shaft assembly extending through and supported by said interior channel, said shaft assembly including a front shaft portion and a rear shaft portion, said shaft assembly including a spring-contacting portion, said shaft assembly including a locking portion, said shaft assembly adapted for being located in said interior channel in either a locked position or an unlocked position, a hook assembly which includes a predetermined number of hooks, wherein said predetermined number of slots is equal to said predetermined number of hooks, wherein said hook assembly has an outer width, wherein said outer width of said hook assembly is less than said width of said rear portion of said housing, whereby said hook assembly is protected by said rear portion of said housing when said hook assembly is in a protected mode in which tip portions said hooks are retained within said slots, a spring assembly, supported by said housing, in contact with said spring-contacting portion of said shaft assembly, such that, when said spring-contacting portion is moved along said longitudinal axis toward said front portion of said housing such that said shaft assembly is in the locked position, said spring assembly stores potential energy, and a trigger assembly connected to said housing, wherein said trigger assembly includes a fish-strike-receiving portion and an unlocking portion connected to said fish-strike-receiving portion, wherein said unlocking portion is adapted to release said shaft assembly from the locked position to permit said shaft assembly to return to the unlocked position, wherein said trigger assembly includes:
a fish-strike-receiving portion in a form of a resilient strip spring having a rear end connected to said housing and having a front end extending beyond said front portion of said housing, and
an unlocking portion connected to said front end of said fish-strike-receiving portion for engaging said locking portion of said shaft assembly when said shaft assembly is in the locked position.

2. The apparatus of claim 1 wherein:
said spring-contacting portion of said shaft assembly is located at said rear shaft portion, and
said spring assembly includes a spiral spring extending around said rear shaft portion.

3. The apparatus of claim 1 wherein:
said spring-contacting portion of said shaft assembly is located at said rear shaft portion of said shaft assembly, and
said locking portion of said shaft assembly is located at said front shaft portion of said shaft assembly.

4. A fishing lure apparatus, comprising:

a housing which includes a front portion, a rear portion, and an interior channel extending from said front portion to said rear portion and located along a longitudinal axis, wherein said rear portion has an outer width and includes a predetermined number of slots, a shaft assembly extending through and supported by said interior channel, said shaft assembly including a front shaft portion and a rear shaft portion, said shaft assembly including a spring-contacting portion, said shaft assembly including a locking portion, said shaft assembly adapted for being located in said interior channel in either a locked position or an unlocked position, a hook assembly which includes a predetermined number of hooks, wherein said predetermined number of slots is equal to said predetermined number of hooks, wherein said hook assembly has an outer width, wherein said outer width of said hook assembly is less than said width of said rear portion of said housing, whereby said hook assembly is protected by said rear portion of said housing when said hook assembly is in a protected mode in which tip portions said hooks are retained within said slots, a spring assembly, supported by said housing, in contact with said spring-contacting portion of said shaft assembly, such that, when said spring-contacting portion is moved along said longitudinal axis toward said front portion of said housing such that said shaft assembly is in the locked position, said spring assembly stores potential energy, and a trigger assembly connected to said housing, wherein said trigger assembly includes a fish-strike-receiving portion and an unlocking portion connected to said fish-strike-receiving portion, wherein said unlocking portion is adapted to release said shaft assembly from the locked position to permit said shaft assembly to return to the unlocked position, wherein said trigger assembly includes:
a fish-strike-receiving portion in a form of a pivoted arm,
a pivot pin connected to said housing and receiving said pivoted arm,
a shaft-shifter cam connected to said pivoted arm,
a cam-receiving slot in said housing for receiving said shaft-shifter cam, and
a stop portion, connected to said shaft assembly, for engaging a seat portion of said housing when said shaft assembly is in a locked position.

* * * * *